United States Patent
Cawse et al.

(10) Patent No.: US 8,688,380 B2
(45) Date of Patent: Apr. 1, 2014

(54) EVEN DRIVEN DATA ACQUISITION SWITCH

(75) Inventors: Neil Charles Cawse, Oakville (CA); Darren Marc Lohmann Beams, Oakville (CA); Antonios Partheniou, Burlington (CA); Stelian Dumitrascu, Mississauga (CA)

(73) Assignee: GEOTAB Inc., Oakville, Ontario (CA)

( * ) Notice: Subject to any disclaimer, the term of this patent is extended or adjusted under 35 U.S.C. 154(b) by 131 days.

(21) Appl. No.: 13/506,479

(22) Filed: Apr. 23, 2012

(65) Prior Publication Data
US 2013/0282228 A1 Oct. 24, 2013

(51) Int. Cl.
*G05D 1/00* (2006.01)
*G05D 3/00* (2006.01)
*G06F 17/00* (2006.01)
*G01C 21/00* (2006.01)

(52) U.S. Cl.
USPC .......... 701/540; 701/2; 701/7; 701/9; 701/24; 701/25; 701/26; 701/74; 701/79; 701/430; 701/450; 701/451; 701/452; 701/527; 303/181; 303/182; 303/183; 303/184; 303/185

(58) Field of Classification Search
CPC ......... G06F 17/00; G06F 3/0346; G05D 1/00; G05D 3/00; B62D 6/00; G01C 21/00; G01C 23/00; B60T 8/00; B60T 8/58; B60T 8/74; B60T 8/32
USPC ............. 701/9, 74, 430, 540, 2, 7, 24–26, 70, 701/79, 110, 450–452, 502, 527; 303/132, 303/176–177, 181–185, DIG. 5
See application file for complete search history.

(56) References Cited

U.S. PATENT DOCUMENTS

| | | | |
|---|---|---|---|
| 5,826,902 A | 10/1998 | Foo et al. | |
| 6,529,810 B2 | 3/2003 | Foo et al. | |
| 6,529,811 B2 | 3/2003 | Watson et al. | |
| 7,057,503 B2 | 6/2006 | Watson et al. | |
| 7,280,878 B1 * | 10/2007 | Rossum | 700/94 |
| 7,359,781 B2 | 4/2008 | Foo et al. | |
| 7,389,178 B2 * | 6/2008 | Raz et al. | 701/29.1 |
| 7,499,779 B2 | 3/2009 | Geborek et al. | |
| 7,698,036 B2 | 4/2010 | Watson et al. | |
| 2003/0182041 A1 * | 9/2003 | Watson | 701/45 |
| 2004/0199300 A1 * | 10/2004 | Gustafsson et al. | 701/1 |
| 2005/0234679 A1 * | 10/2005 | Karlsson | 702/181 |
| 2006/0251293 A1 * | 11/2006 | Piirainen et al. | 382/104 |
| 2009/0069153 A1 * | 3/2009 | Liu et al. | 477/107 |
| 2009/0099735 A1 | 4/2009 | McCoy et al. | |
| 2010/0057360 A1 * | 3/2010 | Ohkubo | 701/220 |
| 2010/0207754 A1 * | 8/2010 | Shostak et al. | 340/450 |
| 2010/0250021 A1 * | 9/2010 | Cook et al. | 701/1 |
| 2011/0082626 A1 | 4/2011 | Foo et al. | |
| 2011/0184645 A1 * | 7/2011 | Chansarkar | 701/216 |
| 2011/0282553 A1 | 11/2011 | Foo et al. | |

\* cited by examiner

*Primary Examiner* — Mary Cheung
*Assistant Examiner* — Atul Trivedi
(74) *Attorney, Agent, or Firm* — Derek K. W. Smith

(57) ABSTRACT

A method and apparatus in a vehicular telemetry system and a remote data analysis system for detecting an event and switching a data acquisition mode. Checking a state of a data acquisition mode. If the state is in a filtered data state and if an indicator value is at or above a threshold value, then switch the data acquisition mode to an unfiltered data state and acquire unfiltered data. If the data acquisition mode is in an unfiltered data state and if the indicator value is below the threshold value, switch the data acquisition mode to a filtered data state and acquire filtered data.

38 Claims, 6 Drawing Sheets

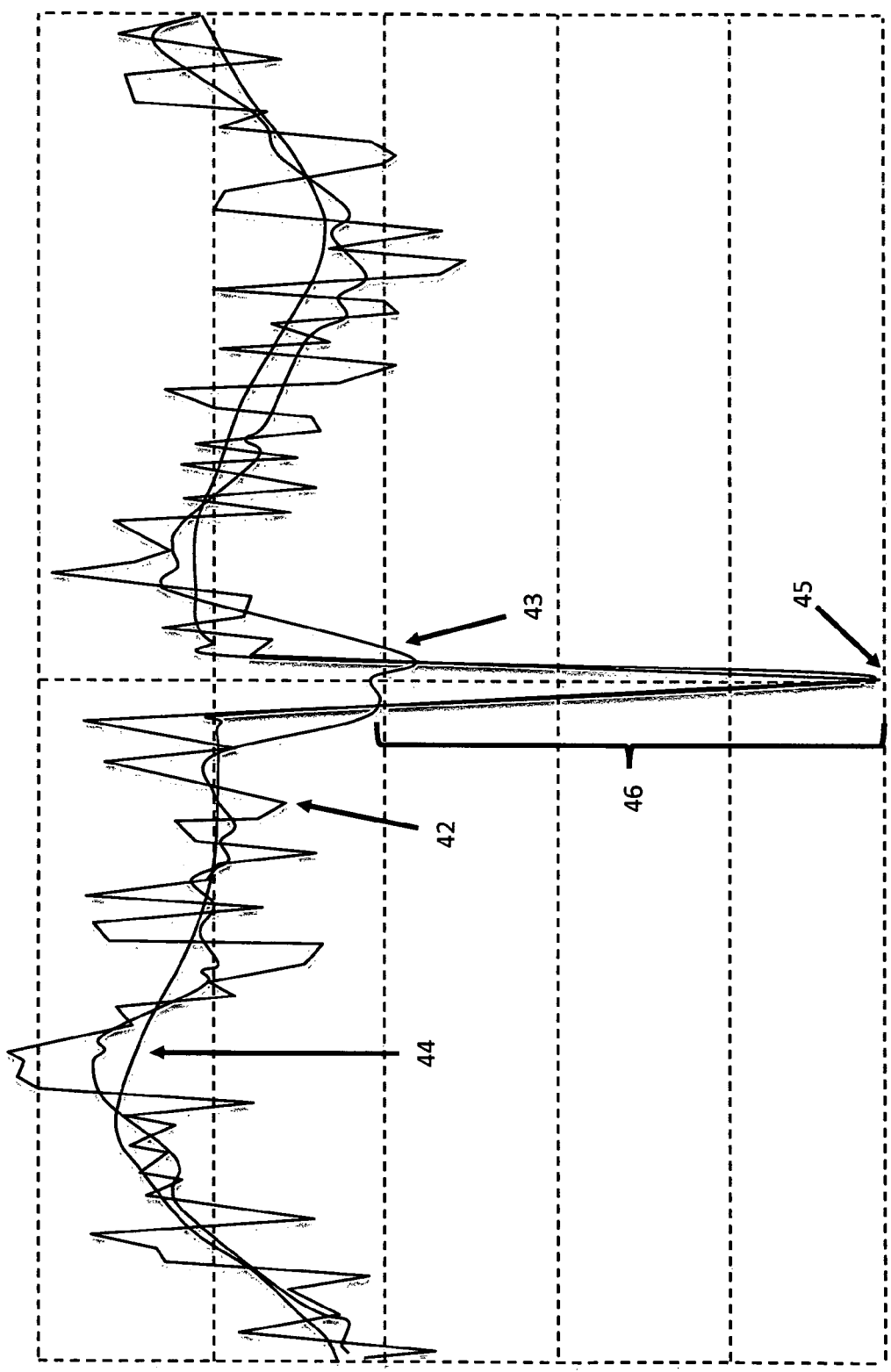

EVEN DRIVEN DATA ACQUISITION SWITCH

TECHNICAL FIELD OF THE INVENTION

The present invention generally relates to a method and apparatus for application in vehicular telemetry systems. More specifically, the present invention relates to detection of significant events in a lower resolution filtered data acquisition mode and switching to a higher resolution raw unfiltered data acquisition mode.

BACKGROUND OF THE INVENTION

Vehicular Telemetry systems with event detection are known in the prior art.

U.S. Pat. No. 7,359,781 to Foo et al is directed to an apparatus for controlling a multistate occupant restraining system of a vehicle. The apparatus includes a crash sensor sensing crash acceleration at a substantially central location of the vehicle. A crush zone accelerometer provides a crush zone crash acceleration signal. A controller provides a crash velocity value and a crush displacement value in response to the crash acceleration signal. A plurality of predetermined crash velocities as a function of crash displacement threshold maps is also provided, permitting both symmetric and asymmetric crash detection.

U.S. Pat. No. 5,826,902 to Foo et al is directed to an apparatus for controlling actuation of a first actuatable restraint and a second actuatable restraint. The apparatus includes a first crash accelerometer for providing a discriminating crash acceleration signal when a crash event is sensed in a first direction, a safing crash acceleration signal when a crash event is sensed in the first direction, and a discriminating crash acceleration signal when a crash event is sensed in the second direction. A third crash accelerometer provides another safing crash signal when a crash event is sensed in either the first or second directions. The first actuatable restraint is actuated when the first accelerometer provides the discriminating crash acceleration signal and either the second or third accelerometers provide a safing crash signal.

United States published patent application US2011/0082626 to Foo et al is directed to an apparatus for determining a pitch-over condition of a vehicle with a first accelerometer for sensing acceleration in a Z-axis direction substantially perpendicular to both a front to rear axis of the vehicle and a side to side axis of the vehicle and for providing a first acceleration signal indicative thereof. A second accelerometer for sensing acceleration in an X-axis direction substantially parallel to the front to rear axis of the vehicle and provides a second acceleration signal indicative thereof. A controller determines a Z-axis velocity value from the first acceleration signal and a pitch over condition of the vehicle in response to both the calculated Z-axis velocity value and the second acceleration signal.

U.S. Pat. No. 6,529,810 to Foo et al is directed to controlling a vehicle multistage actuatable occupant restraining system. A crash sensor senses crash acceleration and provides a crash acceleration signal indicative of a crash. Crash velocity and crash displacement are determined in response to the crash acceleration signal. A first stage of a multistage actuatable occupant restraining system is actuated when the determined crash velocity as a function of crash displacement exceeds a low threshold. A transverse accelerometer senses transverse crash acceleration. The transverse acceleration as a function of the crash displacement is compared against a transverse threshold. The value of the low threshold is switched to a different value when the transverse acceleration exceeds the transverse threshold.

U.S. Pat. No. 7,499,779 to Geborek et al is directed to a method and system for detecting a vehicle rollover or dangerous situation that may lead to a rollover of a vehicle. The method includes the steps of measuring the set of input signals, including at least a vehicle velocity, vehicle steering angle, vehicle lateral acceleration, and vehicle roll rate. Integrating the vehicle roll rate to obtain the vehicle roll angle increment. Determining the vehicle state on the basis of the input signals. Determining the vehicle estimated lateral acceleration corresponding to the vehicle true roll angle, on the basis of at least the vehicle state, vehicle lateral acceleration, and the centrifugal acceleration. Determine the vehicle estimated roll angle on the basis of at least the vehicle roll angle increment, the vehicle estimated later acceleration and the vehicle state, and generating an output activation signal determining a possibility of rollover of the vehicle as a function of at least the vehicle estimated roll angle and the vehicle roll rate.

U.S. Pat. No. 7,698,036 to Watson et al is directed to a roll angular velocity sensor and an occupant sensor operatively coupled to a processor that provides for detecting a rollover condition responsive to a measure of roll angular velocity and controlling a safety restraint system. Detection criteria associated with the rollover detection process is responsive to a signal from the occupant sensor.

United States published patent application to Foo et al is directed to an apparatus for detecting a pedestrian vehicle impact. The apparatus includes a number of sensors mounted near a forward location of the vehicle. Each sensor providing an associated signal indicative of an impact event. A metric determining device determines metric values for each of the sensor signals. A controller determines if any of the determined metric values indicates the occurrence of a misuse event. The controller also determines if a pedestrian vehicle impact event is occurring by comparing the metric value of a least one sensor signal against a selectable threshold. An actuation signal is provided in response to the comparison. The selectable threshold is selected in response to the determined occurrence of a misuse even. An actuatable pedestrian impact mitigation device is attached to the vehicle and is actuated in response to the actuation signal from the controller.

United States published patent application to McCoy et al is directed to an automobile rollover prediction and restraint device deployment system. The device includes a plurality of automobile data sensors to generate a plurality of data signals, and a controller to receive the data signals and configured to deploy resettable and non-resettable restraint devices. The controller is configured to activate at least one resettable restraint device when one or more of the data signals exceed a first threshold, indicating that the vehicle is in a position or undergoing movement that indicates a potential for vehicle rollover, and to de-activate the at least one resettable restraint device when one or more of the data signals fall below the first threshold.

U.S. Pat. No. 6,529,811 to Watson et al is directed to detecting a rollover condition responsive to the comparison of a figure of merit with a threshold wherein the threshold is given generally as a function of a period of time commencing with a time of inception determined from one or both of a measure of lateral acceleration and a measure of angular velocity. The measures of lateral acceleration and angular velocity are filtered, and are compensated to remove offset errors.

U.S. Pat. No. 7,057,503 to Watson is directed to a roll angular velocity sensor and a lateral velocity sensor operatively coupled to a processor which generates a signal for controlling a safety restraint system responsive to measures of roll angular velocity and lateral velocity. The processor delays or inhibits the deployment of the safety restraint system responsive to a measure responsive to the measure of lateral velocity, either alone or in combination with a measure of longitudinal velocity. A deployment threshold is responsive to the measure of lateral velocity. The lateral velocity may be measured by a lateral velocity sensor or estimated responsive to measures of lateral acceleration, vehicle turn radius, and either longitudinal velocity or yaw angular velocity wherein the turn radius is estimated from either a measure of steering angle, a measure of front tire angle, or measure of forward velocity from separate front wheel speed sensors.

SUMMARY OF THE INVENTION

The present invention is directed to aspects in a vehicular telemetry system and provides a new capability to detect a significant event and switch the data acquisition mode in real time providing a data structure stored in a computer readable medium.

According to a first broad aspect of the invention, there is an apparatus for detecting an event and switching a data acquisition mode comprising: a microprocessor, an accelerometer, and a memory. The microprocessor communicating with the accelerometer and the memory. The accelerometer communicating data corresponding to an axis of the accelerometer to the microprocessor. The microprocessor executing computer program code for checking a state of the data acquisition mode. If the state is in a filtered data state and if an indicator value is at or above a threshold value, switch the data acquisition mode to an unfiltered data state and acquire unfiltered data. If the data acquisition mode is in an unfiltered data state and if the indicator value is below the threshold value, switch the data acquisition mode to a filtered data state and acquire filtered data.

In an embodiment of the invention, the microprocessor executing computer program code further determining an indicator value by applying a filter to accelerometer data.

In another embodiment of the invention, the microprocessor executing computer program code for a moving average filter and providing an accelerometer based filtered data point. The indicator value is determined by comparing the accelerometer based filtered data point with an accelerometer based unfiltered data point.

In another embodiment of the invention, the microprocessor stores the unfiltered data and the filtered data as a data log. In another embodiment of the invention, the microprocessor stores the data log in memory. In another embodiment of the invention, the apparatus further includes a communications microprocessor wherein the data log is transmitted to a remote device.

In another embodiment of the invention, the accelerometer has multiple axes and an associated threshold value for each axis and an indicator value for each axis.

According to a second broad aspect of the invention, there is a computer readable storage medium having computer readable program code for executing a method for detecting an event and switching the data acquisition mode. The computer readable storage medium includes memory, diskettes, and CDROM mediums.

In a third aspect of the invention, there is a method for detecting an event and switching the data acquisition mode comprising, checking a state of a data acquisition mode. If the state is in a filtered data state and if an indicator value is at or above a threshold value, switch the data acquisition mode to an unfiltered data state and acquire unfiltered data. If the data acquisition mode is in an unfiltered data state and if the indicator value is below the threshold value, switch the data acquisition mode to a filtered data state and acquire filtered data.

In an embodiment of the invention, the unfiltered data state is an adaptive data state and the filter is an adaptive filter being less than a filter in said filtered data state and more than a filter is the unfiltered data state wherein the unfiltered data is adaptive data.

In another embodiment of the invention, the indicator value is determined by a filter and accelerometer data. In another embodiment of the invention, the filter is a low pass filter. In another embodiment of the invention, the filter is a moving average filter. In another embodiment of the invention, the moving average filter provides an accelerometer based filtered data point and the indicator value is determined by comparing the accelerometer based filtered data point with an accelerometer based unfiltered data point. In another embodiment of the invention, the comparing may be subtracting an accelerometer based filtered data point and an accelerometer based unfiltered data point. In another embodiment of the invention, the comparing may be an absolute value between an accelerometer based filtered data point and an accelerometer unfiltered data point. In another embodiment of the invention, each axis of the accelerometer has an associated indicator value.

In another embodiment of the invention, the threshold value is a set predetermined value. In another embodiment of the invention the threshold value is a programmable value. In another embodiment of the invention, the threshold value is a real time programmable value. In another embodiment of the invention, the threshold value is a vector-based value. In another embodiment of the invention, the threshold value is a magnitude-based value. In another embodiment of the invention, the threshold value includes multiple threshold values. In another embodiment of the invention, the multiple threshold values are graduated values such as a high value, a medium value, or a low value. In another embodiment of the invention, each axis of an accelerometer has an associated threshold.

In another embodiment of the invention, the unfiltered data and the filtered data are stored as a data log. In an embodiment of the invention, the data log is stored in memory. In another embodiment of the invention, the data log is transmitted to a remote device. In another embodiment of the invention, the data log is a data structure. In another embodiment of the invention, the data structure may include accelerometer data, or vehicular data and information, or GPS data or a combination of the data. In another embodiment of the invention, the data log includes unfiltered data interspersed with filtered data characterized by an event. In another embodiment, the data structure is stored in a computer readable medium. In another embodiment of the invention, the unfiltered data may include accelerometer data, vehicular data and information, GPS data, or a combination of data. In another embodiment of the invention, the filtered data may include any or all of accelerometer data, and/or vehicular data and information, and/or GPS data.

In a fourth broad aspect of the invention, there is a computer readable medium with a stored data structure. In an embodiment of the invention, the data structure has filtered data and unfiltered data interspersed with the filtered data. The unfiltered data characterized by detecting an event in real time. The data structure provides a post historical view of the event from the filtered data and unfiltered data interspersed with the filtered data.

In a fifth broad aspect of the invention, there is a system for detecting an event, the system comprising a vehicular telematics system and a remote device. The telematics system including an on-board portion and a resident portion. The on-board portion including a microprocessor and firmware for executing computer program code for detecting an event and formatting a data structure. An accelerometer for providing accelerometer data to the microprocessor. A communications microprocessor for transmitting the data structure. A GPS module for providing GPS data to the microprocessor. Memory for storing the data structure and an interface to the resident portion for receiving vehicular data and information from a vehicle network communications bus and associated microcontrollers and sensors. The remote device including a server and access to at least one data analysis application computer program. The microprocessor and firmware checking a state of a data acquisition mode. If the state is in a filtered data state and if an indicator value is at or above a threshold value, switch the data acquisition mode to an unfiltered data state and acquire unfiltered data. If the data acquisition mode is in an unfiltered data state and if the indicator value is below the threshold value, switch the data acquisition mode to a filtered data state and acquire filtered data. The microprocessor storing the unfiltered data and the filtered data in a data log a data structure including unfiltered data interspersed with the filtered data characterized by the event, wherein the telematics system transmits the data structure to the remote device and the remote device sores the data structure for further analysis by the data analysis application computer program.

In an embodiment of the invention, the data structure may be analyzed in an insurance sense. In another embodiment of the invention, the data structure may be analyzed in a forensics sense.

These and other aspects and features of non-limiting embodiments are apparent to those skilled in the art upon review of the following detailed description of the non-limiting embodiments and the accompanying drawings.

BRIEF DESCRIPTION OF THE DRAWINGS

Exemplary non-limiting embodiments of the present invention are described with reference to the accompanying drawings in which:

FIG. 2*b* is an enlarged view of the graph illustrated in 2*a* at the significant event;

The drawings are not necessarily to scale and may be diagrammatic representations of the exemplary non-limiting embodiments of the present invention.

DETAILED DESCRIPTION

Hardware

Figure 1:
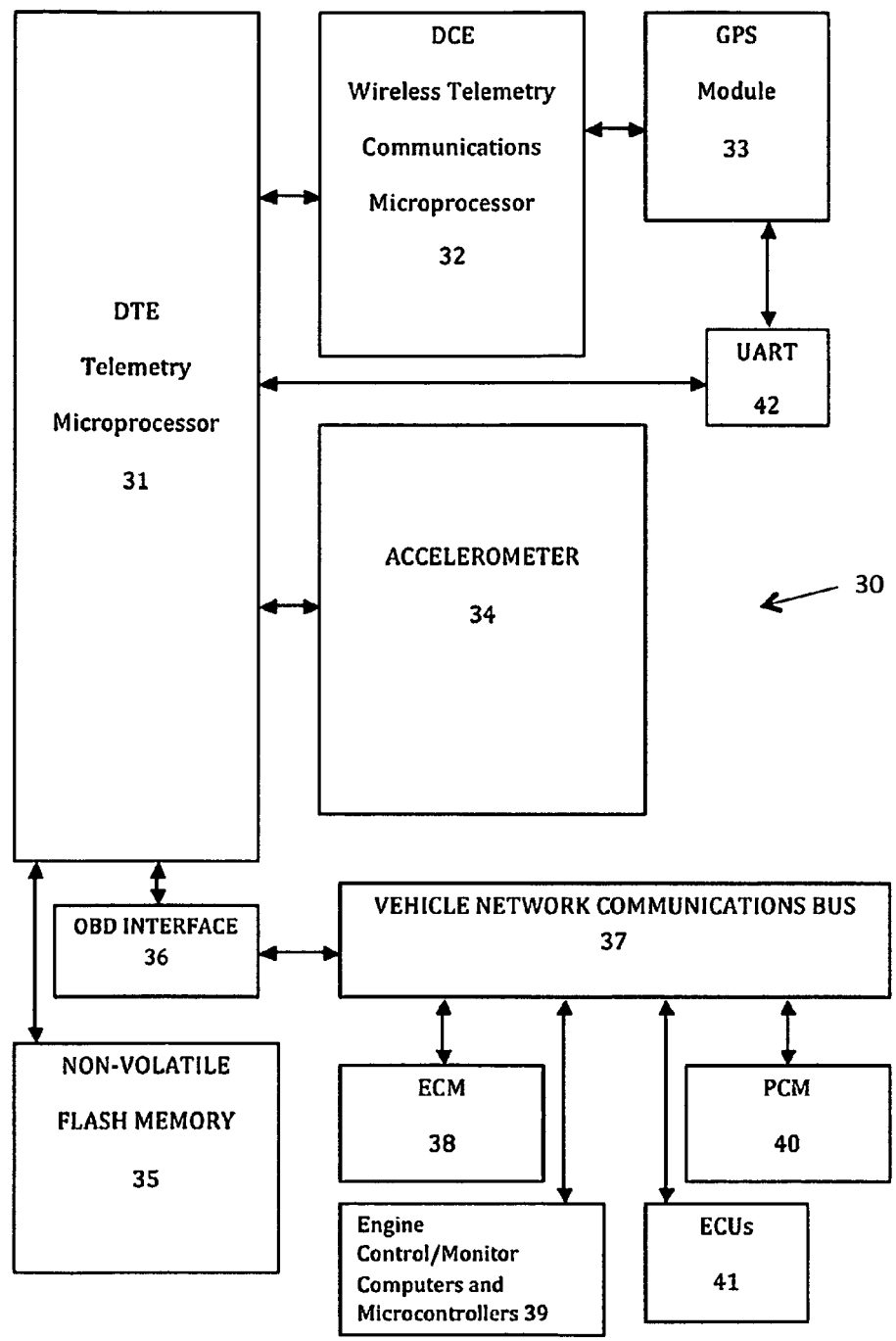
FIG. 1 is diagrammatic view of an vehicular telemetry hardware system including an on-board portion and a resident vehicular portion.

Referring initially to FIG. 1 of the drawings, there is illustrated a vehicular telemetry hardware system generally indicated at 30. The on-board portion generally includes: a DTE (data terminal equipment) telemetry microprocessor 31; a DCE (data communications equipment) wireless telemetry communications microprocessor 32; a GPS (global positioning system) module 33; a UART (universal asynchronous receiver/transmitter) 42; an accelerometer 34; a non-volatile flash memory 35; and provision for an OBD (on board diagnostics) interface 36 for communicating with a vehicle network communications bus 37.

The resident vehicular portion generally includes: the vehicle network communications bus 37; the ECM (electronic control module) 38; the PCM (power train control module) 40; the ECUs (electronic control units) 41; and other engine control/monitor computers and microcontrollers 39.

While the system is described as having an on-board portion and a resident vehicular portion, it is also understood that the present invention could be a complete resident vehicular system or a complete on-board system.

The DTE telemetry microprocessor is interconnected with the OBD interface 36 for communication with the vehicle network communications bus 37. The vehicle network communications bus 37 in turn connects for communication with the ECM 38, the engine control/monitor computers and microcontrollers 39, the PCM 40, and the ECU 41.

The DTE telemetry microprocessor has the ability through the OBD interface 36 when connected to the vehicle network communications bus 37 to monitor and receive vehicle data and information from the resident vehicular system components for further processing.

As a brief non-limiting example of vehicle data and information, the list may include: VIN (vehicle identification number), current odometer reading, current speed, engine RPM, battery voltage, engine coolant temperature, engine coolant level, accelerator peddle position, brake peddle position, various manufacturer specific vehicle DTCs (diagnostic trouble codes), tire pressure, oil level, airbag status, seatbelt indication, emission control data, engine temperature, intake manifold pressure, transmission data, braking information, and fuel level. It is further understood that the amount and type of vehicle data and information will change from manufacturer to manufacturer and evolve with the introduction of additional vehicular technology.

Continuing now with the DTE telemetry microprocessor 31, it is further interconnected for communication with the DCE wireless telemetry communications microprocessor 32. In an embodiment of the invention, an example of the DCE wireless telemetry communications microprocessor 32 is a Leon 100 commercially available from u-blox Corporation. The Leon 100 provides mobile communications capability and functionality to the vehicular telemetry hardware system 30 for sending and receiving data to/from a remote site. A remote site could be another vehicle or a ground based station.

The DCE wireless telemetry communications microprocessor 32 is also interconnected for communication to the GPS module 33. In an embodiment of the invention, an example of the GPS module 33 is a Neo-5 commercially available from u-blox Corporation. The Neo-5 provides GPS receiver capability and functionality to the vehicular telemetry hardware system 30.

The DTE telemetry microprocessor 31 is also interconnected to the GPS module 33 through the UART 42 permitting direct communications between the microprocessor 31 and the GPS module 33.

The DTE telemetry microprocessor 31 is further interconnected with an external non-volatile flash memory 35. In an embodiment of the invention, an example of the flash memory 35 is a 32 MB non-volatile flash memory store commercially available from Atmel Corporation. The flash memory 35 of the present invention is used for data logging.

The DTE telemetry microprocessor 31 is further interconnected for communication with an accelerometer (34). An accelerometer (34) is a device that measures the physical acceleration experienced by an object. Single and multi-axis models of accelerometers are available to detect the magnitude and direction of the acceleration, or g-force, and the device may also be used to sense orientation, coordinate acceleration, vibration, shock, and falling.

In an embodiment of the invention, an example of a multi-axis accelerometer (34) is the LIS302DL MEMS Motion Sensor commercially available from STMicroelectronics. The LIS302DL integrated circuit is an ultra compact low-power three axes linear accelerometer that includes a sensing element and an IC interface able to take the information from the sensing element and to provide the measured acceleration data to other devices, such as a DTE Telemetry Microprocessor (31), through an I2C/SPI (Inter-Integrated Circuit) (Serial Peripheral Interface) serial interface. The LIS302DL integrated circuit has a user-selectable full scale range of +−2 g and +−8 g, programmable thresholds, and is capable of measuring accelerations with an output data rate of 100 Hz or 400 Hz.

In an embodiment of the invention, the DTE telemetry microprocessor 31 also includes an amount of internal flash memory for storing firmware that executes the method of the present invention as well as other methods to operate and control the overall system. In an embodiment of the invention, an example of a DTE telemetry microprocessor 31 is a PIC24H microcontroller commercially available from Microchip Corporation.

Real Time Acceleration & Events

Figure 2A:
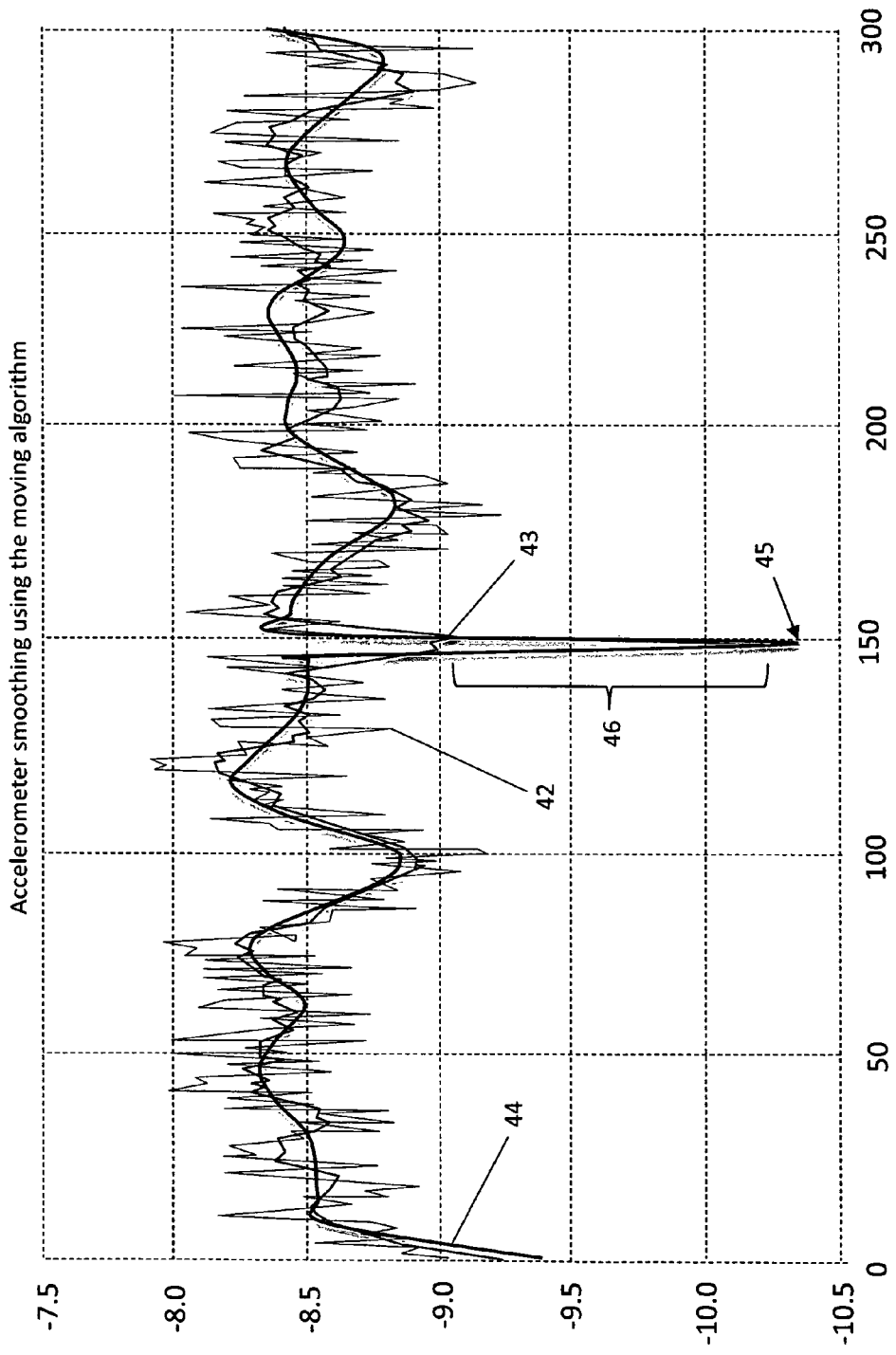
FIG. 2*a* is a graph illustrating a simulated real time acceleration curve, a raw noisy accelerometer curve based upon raw unfiltered data points, a sixteen point moving average accelerometer curve based upon filtered data points, and an indication of a significant event.

Referring now to FIGS. 2a and 2b, there is illustrated a graph of a simulated real time acceleration curve 44 with a significant event generally indicated at 45.

Overlaid with the simulated real time acceleration curve 44 is an accelerometer data curve 42 based upon raw accelerometer unfiltered data points as communicated in real time from the accelerometer 34 to the DTE telemetry microprocessor 31. As can be seen from the graph, the accelerometer data curve 42 is very noisy. In addition, there is a significant amount of raw unfiltered accelerometer data and that may also be problematic in view of the amount of available memory for the data as well as the amount of available processing resource for the microprocessor. Stated another way, you could have too much data for the available memory or you could require too much processing time from the microprocessor, or you could have too much noise.

Also overlaid with the simulated real time acceleration curve 44 is a filtered accelerometer curve 43 based upon filtered data points, for example, from a sixteen point moving average filter. As can be seen from the graph, the filtered accelerometer curve 43 has less noise, is smoother, and tends to track more closely the simulated real time actual acceleration curve 44, except at the significant event 45 and hence, the significant event may not be detected.

In an embodiment of the invention, for example, a significant event could be an accident where the accelerometer 34 undergoes a steep acceleration, or a steep deceleration caused by a sudden impact as generally indicated at 45. This type of significant event tends to be very short, typically 160 ms or less in duration.

However, as also illustrated by the significant event 45, the accelerometer data curve 42 does follow the real time actual acceleration curve 44 more closely at the event, but since this curve is not monitored, the significant event is also not detected.

Thresholds

Significant events may be identified in part by a threshold value. For example, as illustrated in FIGS. 2a and 2b, a predetermined threshold 46 may be established and compared with the difference between an unfiltered data point of the acceleration data curve 42 and the associated filtered data points of the filtered acceleration curve 43. As can been seen at the significant event 45, the difference between the data point of the filtered acceleration curve 43 and the acceleration data curve are at or above the threshold 46 limit indicating the presence of the significant event 45.

Conversely, a different threshold could be set detecting or indicating normal operation. For example, applying the threshold 46 either before the significant event 45 or after the significant event, you can see that the difference between the data points of the filtered acceleration curve 43 and the acceleration data curve are below the threshold limit indicating there is no significant event 45 present.

The following table 1 illustrates by way of example, a number of different thresholds relating to aspects of a harsh significant event. There are also different aspects, or a graduation associated with the threshold values to include low sensitivity, medium sensitivity, and high sensitivity. Included in the harsh category are the acceleration of the vehicle, the deceleration of the vehicle (braking), and the cornering of the vehicle.

TABLE 1

Example thresholds for a harsh significant event with different aspects.

| Aspect Of Event | Significant Event Type | Accelerometer Data | Range |
|---|---|---|---|
| High Sensitivity | Harsh Acceleration | Forward or Braking | (3.52, 90) |
| | Harsh Braking | Forward or Braking | (−90, −3.88) |
| | Harsh Corning (Left) | Side to Side | (3.88, 90) |
| | Harsh Corning (Right) | Side to Side | (−90, −3.88) |
| Medium Sensitivity | Harsh Acceleration | Forward or Braking | (4.41, 90) |
| | Harsh Braking | Forward or Braking | (−90, −4.76) |
| | Harsh Corning (Left) | Side to Side | (4.76, 90) |
| | Harsh Corning (Right) | Side to Side | (−90, −4.76) |
| Low Sensitivity | Harsh Acceleration | Forward or Braking | (5.29, 90) |
| | Harsh Braking | Forward or Braking | (−90, −5.64) |
| | Harsh Corning (Left) | Side to Side | (5.64, 90) |
| | Harsh Corning (Right) | Side to Side | (−90, −5.64) |

The following table further illustrates by way of example, a number of different thresholds relating to a 5 km/h accident.

TABLE 2

Example thresholds for an accident significant event.

| Significant Event Type | Accelerometer Data | Range |
|---|---|---|
| Accident | Forward | (24.5, 90) |
| | Backward | (−90, −24.5) |
| | Side to Side | (24.5, 90) |
| | Side to Side | (−90, −24.5) |

Therefore, as illustrated by tables 1 and 2, the threshold value may be a set predetermined value. The threshold values may be a range of values. The threshold values may be graduated based upon sensitivity (high, medium, low). The threshold value may be a vector-based value or a magnitude-based value. In an embodiment of the invention, the threshold value is 500 mg.

Furthermore, the thresholds could be a programmable value in real time based upon the accelerometer in one or more axes of the accelerometer and the speed of a vehicle. For example, a threshold may be adjusted based upon this relationship. The thresholds may be too sensitive at low speeds and not sensitive enough at higher speeds. Therefore, in an embodiment of the invention, a threshold may be set to a lower value, or lowered in real time, as the speed of the vehicle increases. In another embodiment of the invention, a threshold may be set to a higher value, or raised in real time, as the speed of the vehicle decreases. This may be achieved by an equation for threshold based upon vehicle speed and previous threshold values.

Figure 4:
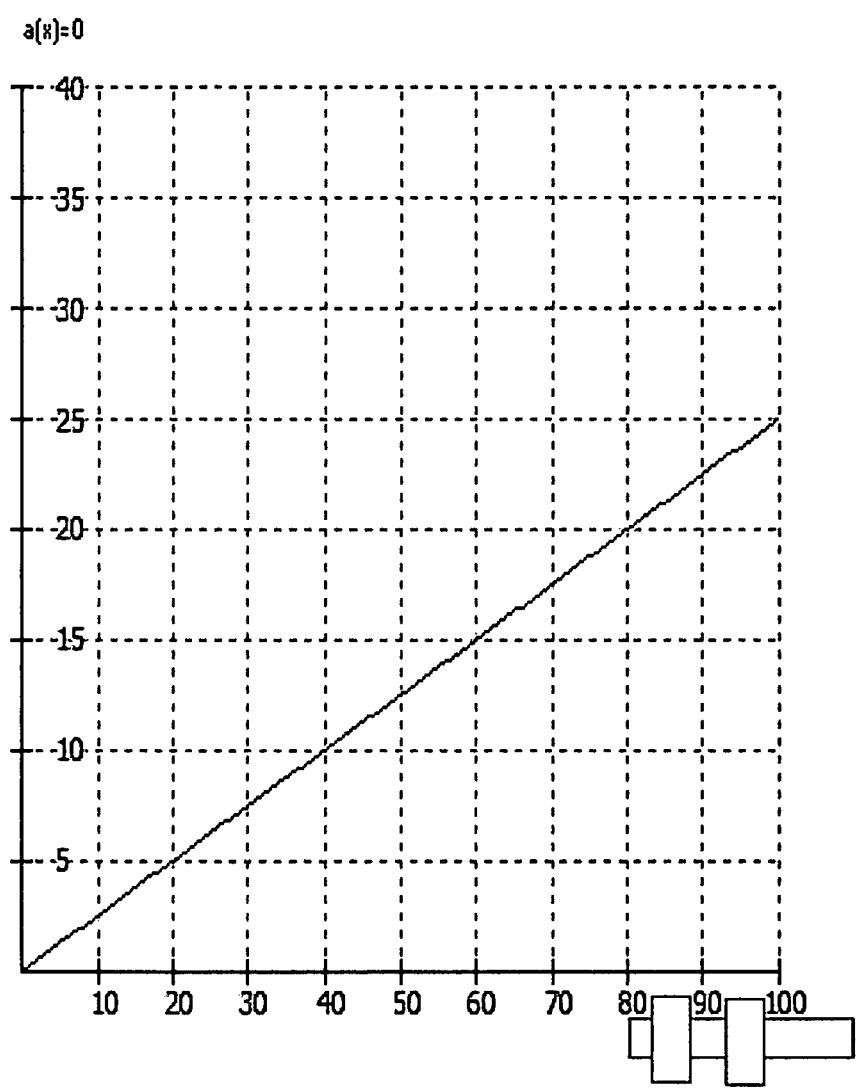
FIG. 4 is a linear graph of acceleration versus speed illustrating dependence of accelerometer thresholds and vehicle road speed.

Referring to FIG. 4, a linear graph of acceleration versus speed is shown. The equation of the line is:

$$Y = mx + b$$

Where Y is a new acceleration threshold, b is the original acceleration threshold, x is the speed of the vehicle, and m is the slope of the line. In an embodiment of the invention the slope is determined and adjusted as follows:

$$m = -((\text{factor})/200)$$

Where the factor is a parameter for changing the slope of the line, for example, the factor may be in the range of 40 to 50 resulting in m=−0.25. Persons skilled in the art will appreciate the choice of the factor is such to compensate for the sensitivity of the accelerometer at low and high speeds, or adjusting the sensitivity at low or high vehicle speeds in a linear sense.

Figure 5:
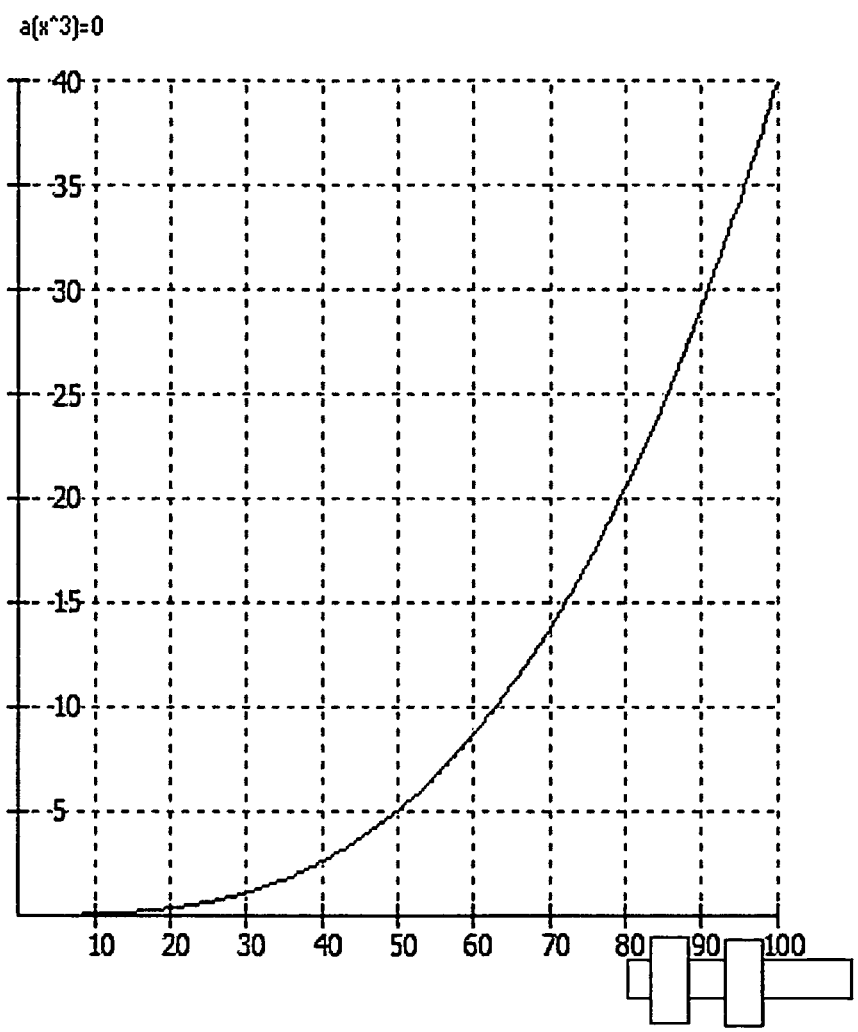
FIG. 5 is an exponential graph of acceleration versus speed illustrating dependence of accelerometer thresholds and vehicle road speed.

Referring now to FIG. 5, an exponential graph of acceleration versus speed is shown. The equation of the line is:

$$Y = m(x^3) + b$$

Where Y is a new acceleration threshold, b is the original acceleration threshold, x is the speed of the vehicle, and m is the slope of the curve. In an embodiment of the invention, the slope is determined and adjusted as follows:

$$m = -((\text{factor})/100000)$$

Here, the factor is also a parameter for changing the curve, and the factor may be in the range of 4 resulting in m=−0.00004. Again, persons skilled in the art will appreciate the choice of the factor here is such to also compensate for the sensitively of the accelerometer at low and high speeds. The exponential curve provides the ability to compensate for small changes at low speeds and ramp up quickly as the speed increases above a target speed, for example 50 km/h.

For the case of setting a value, a data table of values for thresholds and speeds may be used to change the threshold according to sampling the speed at set intervals and comparing the sample with values in the data table.

As another example, thresholds could be based upon operational data and information such as vehicular data and information and GPS data. If the vehicle is a rather large water truck, there could be one threshold for the case where the truck has several tons of water, and a different threshold for the case where the truck does not have any water whereby the water truck is significantly lighter. This could be based upon a sensor, for example water level sensor, or other sensors providing an indication as to the level of water or mass of water in the truck.

However, persons skilled in the art will further appreciate other threshold values may be selected to detect significant events where it is desired to have more detail (unfiltered data) in the data logs around the event.

The invention also contemplates a threshold value per axis from an accelerometer (forward, backward, and side-to-side). These threshold values could be the same per axis, or different per axis depending upon the application and the specifics of the vehicle. For example, with the X axis a X threshold, with the Y axis a Y threshold, and with the Z axis a Z threshold. The threshold values for X, Y, and Z could be equal, or X and Y could be equal, or X and Z could be equal, or Y and Z could be equal.

Filtering

Filtering is a technique to smooth data in digital signal processing. For example, a filter may be applied to raw unfiltered data points such as data from an accelerometer, to provide filtered data points. A filter may also be applied to raw vehicular data and information, or GPS data to provide the associated filtered data points.

Various filtering techniques are contemplated by the invention and generally include low pass filters, averaging filters, running average filters, moving average filters, and adaptive filtering with respect to different sample rates, for example, sample rates at 100 hz or 400 hz. Persons skilled in the art will appreciate that the choice of filter, and the associated parameters for filtering, are such that the filter provides a smoothed representation of the raw unfiltered data. With respect to the accelerometer raw data, the filter provides a smoothed representation of the actual acceleration, following the peaks and valleys of the actual acceleration curve (as illustrated in FIGS. 2a and 2b), but also, depending upon the filter, not following the actual acceleration curve at the significant event.

In an embodiment of the invention, the filter is a moving average filter that operates by averaging the sequential subsets (number of data points in filter sample) of data to determine a series of filtered data points. In this example, the number of data points is sixteen, however, persons skilled in the art will appreciate that other values for the subset of data may be selected without departing from the invention. The moving average filter is based upon a one-sided averaging filter approach. Alternatively, the moving average filter could be based upon a symmetrical averaging filter approach, or a multiple pass moving average filter approach.

Each of the filtered data points in the series are determined by the following equation:

$$\text{filtered data point} = (\text{sum}(M \text{ separate unfiltered data points}))/M$$

Where M is the number of samples in the average per data point. In an embodiment of the invention, M=16 samples.

The moving average filter reduces noise in the unfiltered accelerometer data while keeping a good representation of the associated acceleration as in the accelerometer curve 44 of FIGS. 2a and 2b. The reduction in noise is equal to the square root of the number of samples. The filter also reduces the amount of memory required to store the data, for example, by 16:1 in the case of an embodiment of the invention. It also reduces the amount of data that may be transmitted to a remove device. However, as the number of samples increases (less data to store, process, and transmit to remote devices), the representation of the associated acceleration may become rather poor in some areas rendering it difficult or impossible to detect actual significant events.

As illustrated in FIGS. 2a and 2b with the example embodiment of a sixteen point moving average filter, the filtered data points as represented by the filtered accelerometer curve 43 do not follow the accelerometer curve 44 at the point of the significant event 45 and therefore, it is not be possible to detect the significant event 45 by the filtered accelerometer curve 43.

Switching Logic

Figure 3:
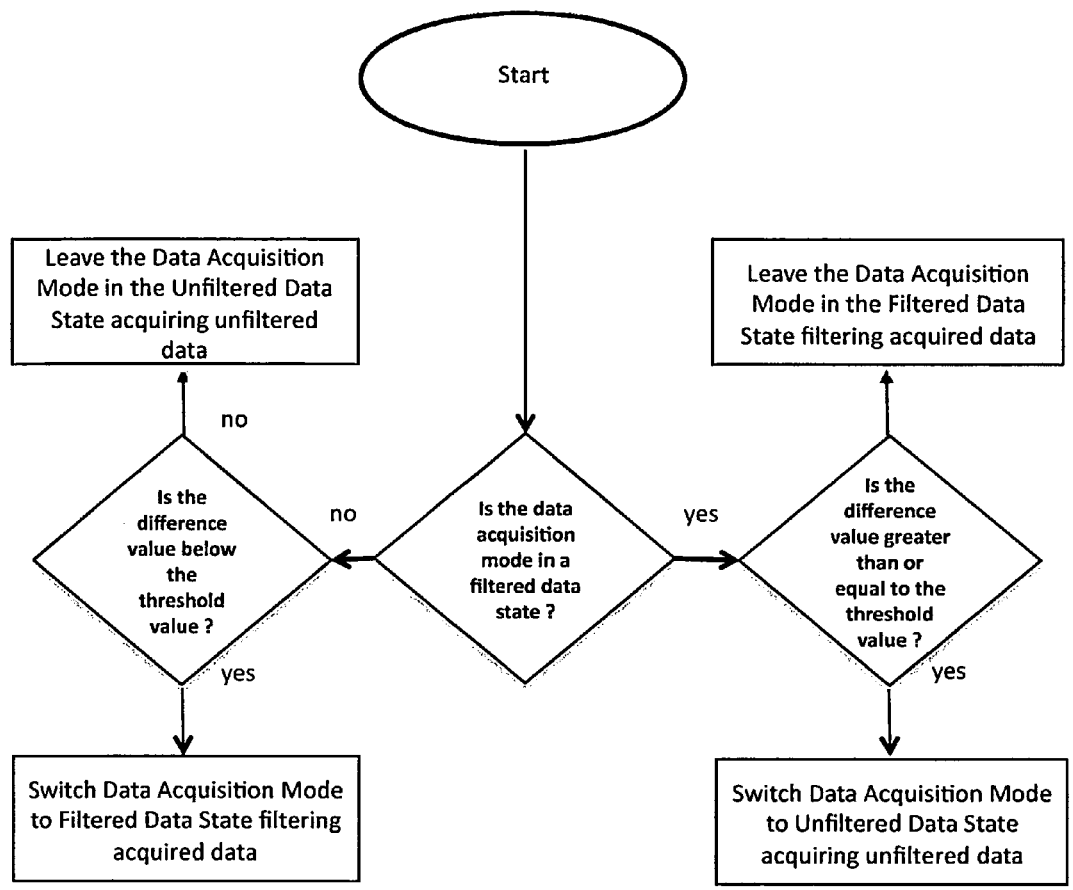
FIG. 3 is a high level diagrammatic representation of the logic of the method embodied in the firmware of a microprocessor.

Referring now to FIG. 3 a diagrammatic representation of the switching logic the present invention is described. The switching logic is described with respect to a single axis from either a single axis accelerometer or a multi-axis accelerometer. However, the switching logic is applicable to multi-axes from either a number of single axis accelerometers or an integral multi axis accelerometer.

The logic of the method initializes a data acquisition mode in a filtered data state. The logic begins by checking the current state of the data acquisition mode.

For the case wherein the data acquisition mode is in the filtered data state, if an indicator value is at or above the threshold value (significant event detected), then switch the data acquisition mode to the unfiltered data state acquiring unfiltered data. If the indicator value is below the threshold value, leave the data capture mode in the filtered data state.

For the case wherein the data capture mode is in the unfiltered data state, if the indicator value is below the threshold value, then switch the data acquisition mode to the filtered data state filtering captured data. If the indicator value is at or above the threshold value (significant event continuing), then leave the data acquisition mode in the unfiltered data state acquiring unfiltered data.

In addition to switching the data acquisition mode for the accelerometer, the logic of the present invention may also switch the data acquisition mode between the filtered data state and the unfiltered data state for data logging of vehicle data and information, and/or GPS data. Normally, data logging occurs in a filtered data state. However, upon detection of a significant event 45, data logging may be switched to an unfiltered data state logging more detailed information around the significant event 45.

Additionally, the logic of the present invention may also switch the data acquisition mode to an adaptive data state with a different filtering resolution. The different filtering resolution is less than the filtered state, but more than an unfiltered state. This permits acquisition of more detailed data than the filtered state, but with less filtering to save on memory and subsequent data transmission to a remove device. This is illustrated by the following filtering relationship:

Filtered Data State>Adaptive Filtered Data State>Unfiltered Data State

In addition, the acquired data for each of the above states has the following relationships. The filtered data state has the least acquired data detail, the adaptive filtered data state has more detail when compared to the filtered data state, but less detail when compared to the unfiltered data state. The unfiltered data state provides the most acquired data detail, or raw unfiltered data.

For example, if the filter is a sixteen point moving average filter in the unfiltered data state, the logic could switch to an adaptive unfiltered data state such as a six point moving average filter. In this example, data logging would occur with more detail than the sixteen point moving average filter case, but with less detail than a completely unfiltered data state. Furthermore, a setting for an adaptive filtered state could be associated and programmable with the type of significant event, or the aspect of the significant event.

Indicator Value

The indicator value may either be set or determined in a number of ways. For example, the indicator value may be set to an accelerometer based filtered data point. Alternatively, the indicator value may be set to an accelerometer based unfiltered data point. An indicator value may be determined by subtracting an accelerometer based filtered data point from a corresponding accelerometer based unfiltered data point. The indicator value may be determined by comparing the values, or magnitudes between an accelerometer based filtered data point and an accelerometer based unfiltered data point. The indicator value could also be the based upon the absolute value between data points. The indicator value could be based upon the rate of change of either a filtered or unfiltered accelerometer based data point. The indicator value may also be determined based upon the sample rate, such as a variable period of time, 10 hertz, or 400 hertz.

Method

Describing the method of the invention in more detail, an amount of data corresponding to an axis of an accelerometer is accessed by the DTE telemetry microprocessor 31 and may be stored in an endless overwriting buffer that is refreshed over time with additional data from the accelerometer. The size of the buffer is selected based upon the available memory, microprocessor speed, and accelerometer speed in order to avoid overflow of the memory. There may also be a buffer per axis of the accelerometer.

By way of further example for one axis of an accelerometer and for one data point in a series of data points, an embodiment of the method may be described as follows:

Receive an amount of unfiltered accelerometer data as a set of data
  Select a subset of unfiltered accelerometer data and
    Determine the indicator value (examples: set to filtered data point, set to unfiltered data point, based upon subtraction of filtered data point and unfiltered data point, set by comparing values or magnitudes between a filtered data point and an unfiltered data point, set to absolutes value between filtered data point and an unfiltered data point, set by rate of change of either a filtered or unfiltered data point)
  Compare the indicator value with the threshold value
    First Case (switch from filtered to unfiltered):
      If the data acquisition mode is in a filtered data state and if the indicator value is at or above the threshold value, then switch the data acquisition mode to an unfiltered data state and acquire unfiltered data
      If the data acquisition mode is a filtered data state and if the indicator value is below the threshold value, then do not switch the state of the data acquisition mode and acquire filtered data
    Second Case (switch from unfiltered to filtered):
      If the data acquisition mode is in an unfiltered data state and if the indicator value is at or above the threshold value, do not switch the state of the data acquisition mode acquire unfiltered data If the data acquisition mode is in an unfiltered data state and if the indicator value is below the threshold value, switch the data acquisition mode to a filtered data state and acquire filtered data Repeat for each subset Repeat for each set Data Logging & Memory Structure The acquired data, filtered and unfiltered may be stored in memory. Alternatively, the acquired data may be transmitted to a remove device. Transmission could occur at predetermined time intervals, or detecting the significant event could trigger transmission. The acquired data becomes a data log as further described.

Data logging is the process of saving the acquired accelerometer data, vehicular data and information, and/or GPS data in the memory. The data acquisition mode may also be applied to the data and information entering into the data logs. For example, vehicular data and information as well as GPS data may be entered into the data logs as unfiltered data points. Alternatively, the data and information may be entered into the data logs as filtered data. Consequently, the data logs may contain both filtered and unfiltered data as acquired in real time, or in an event based time line.

In one embodiment of the invention, memory may contain a pair of partitions. A first memory partition provides a data log that may, for example, contain up to 4,650 miles (7,500 km) of city driving or 39,936 logs and is comprised of lower resolution filtered data. A second memory partition provides a data log that may contain up to 102 minutes of second by second detailed higher resolution unfiltered data, or 6122 logs, the last 72 records, or 1.2 minutes of driving. In view of the higher frequency and larger amount of data received, the second data memory partition operates on a first in first out overwriting paradigm within the bounds of the partition.

Alternatively, as illustrated in Table 3, the memory may contain a single partition. Within this single partition is a real time mix of filtered data points and unfiltered data points. The mix is based upon the real time events, including the significant event that would cause data and information to be saved as unfiltered data points.

TABLE 3

Single partition of mixed data in real time sequence.

| Filtered Data | Filtered Data | Unfiltered Data | Filtered Data | Unfiltered Data |
|---|---|---|---|---|

In accordance with the present invention, provision is also made for the storage of data structures on a computer readable medium, for example, the non-volatile flash memory 35, or data packets for transmission to a remote device, or memory associated with a remote device including CDROM memory. As illustrated in Table 4, there may be first and second data fields. A first data field contains filtered data. A second field contains filtered data interspersed with unfiltered data as determined by the switching logic and method of the invention. This data structure is applicable to accelerometer date, vehicular data and information, and GPS data.

TABLE 4

Data structure with interspersed data.

| First Data Field | Second Data Field |
|---|---|
| Filtered Data @ time 0 | |
| continues | |
| Filtered Data @ time 3 | Filtered Data from T0 to T3 |
| Filtered Data @ time 4 | Unfiltered Data from T3 to T5 |
| Filtered Data @ time 5 | continues |

Apparatus

The apparatus of the present invention is now described with reference to FIGS. 1 and 3.

A microprocessor or computer readable storage medium such as memory residing in the system implements the method of the invention. Memory, may be resident in the microprocessor, for example, the DTE telemetry microprocessor 31, or may be external to a microprocessor. The memory stores a microprocessor or computer readable code for implementing the above pseudo code representation of the logic and method of the invention.

The apparatus detecting an event and switching a data acquisition mode generally includes the following components. A DTE telemetry microprocessor 31, an accelerometer 34, and flash memory 35. The DTE telemetry microprocessor 31 may also include internal memory where the firmware (computer program code) may be stored. The accelerometer 34 communicates an amount of data corresponding to an axis of the accelerometer 34 to the DTE telemetry DTE telemetry microprocessor 31. The DTE telemetry microprocessor 31 receives the accelerometer data into memory. The microprocessor executing the firmware checks the state of a data acquisition mode. If the state is in a filtered data state and if an indicator value is at or above a threshold value, then the DTE telemetry microprocessor 31 switches the state of the data acquisition mode to an unfiltered data state and will acquire unfiltered data. If the data acquisition mode is in an unfiltered data state and if the indicator value is below a threshold value, then the DTE telemetry microprocessor 31 switches the data acquisition mode to a filtered data sate and will acquire filtered data.

When the data acquisition mode is in the filtered data state, then data received from the vehicle network communications bus 27 by the ODB interface 36 is filtered by the DTE telemetry microprocessor 31 before the data is stored within the flash memory 35. In addition, if GPS data from the GPS module 22 is being acquired by the DTE telemetry microprocessor 31, then the GPS data would also be filtered by the DTE telemetry microprocessor 31 before the GPS data is stored within the flash memory 35.

When the data acquisition mode is in the unfiltered data state, then data received by the DTE telemetry microprocessor 31 from the vehicle network communications bus 27 through the ODB interface 36 is unfiltered and stored within the flash memory. In addition, if GPS data from the GPS module 22 is being acquired by the DTE telemetry microprocessor 31, then the GPS data would be unfiltered and stored within the flash memory.

Furthermore, the unfiltered data state may be set to an adaptive data state. When in the adaptive data state, an adaptive filter is applied to the data received by the DTE telemetry microprocessor 31 from the vehicle network communications bus 27 through the ODB interface 36 and adaptive data is stored within the flash memory. In addition, if GPS data from the GPS module 22 is being acquired by the DTE telemetry microprocessor 31, then the GPS data would also be adaptive filtered and stored within the flash memory. An adaptive filter filters less than a filter in the filtered data state, but filters more than a filter in the unfiltered data state providing the adaptive data.

The DTE telemetry microprocessor 31 may determine the indicator value by a filter and accelerometer data. For example, if the filter is a low pass filter, or a moving average filter, the DTE telemetry microprocessor 31 contains the firmware for calculating a filtered data point based upon the algorithm of the moving average filter and sets the indicator value to the filtered data point.

The DTE telemetry microprocessor 31 also determines the threshold value. For example, if the threshold value is an unfiltered data point, then the DTE telemetry microprocessor 31 sets the threshold value to the unfiltered data point.

The DTE telemetry microprocessor 31 and firmware also compare the indicator value with the threshold value such as a subtraction or absolute value and cause the data acquisition state to change.

The DTE telemetry microprocessor 31 may store both unfiltered data and filtered data as a data log in a format determined by the firmware, which may be a data structure. The data structure may include both filtered data and unfiltered data. Both the filtered data and the unfiltered data may be accelerometer data, vehicular data and information, and GPS data.

In an embodiment of the invention, the apparatus may further include a DCE wireless telemetry communications microprocessor 32 communicating with the DTE telemetry microprocessor 31. The DTE telemetry microprocessor 31 may then transmit acquired data to a remote device through the DCE wireless telemetry communications microprocessor 32. The remote device may also be a remote server with a data analysis program. Transmission of the data log could be in real time or a triggered event based upon detecting a significant event. Transmission of the data may be a data packet, or telecommunications message, or signals by a computer medium such as the internet or wireless communications.

In another embodiment of the invention, there is a system for detecting an event, saving a data structure, communicating the data structure to a remote device such as a server, and s data analysis application computer program. The vehicular telematics system includes the on-board portion and a resident portion. The on-board portion includes a DTC telemetry microprocessor 31 and firmware for executing a computer program of the method of the invention, the logic of the invention, and for creating the data structures. An accelerometer provides accelerometer data to the DTE telemetry microprocessor 31. A DCE wireless telemetry communications microprocessor 32 communicates with the DTE telemetry microprocessor 31 for data communications and for transmitting the data structure when required either in real time or upon a triggered event. A GPS module for providing GPS data to the DTE telemetry microprocessor 31. Memory for storing data, data logs, and the data structure. An ODB interface 36 to the resident portion for receiving vehicular data and information from a vehicle network communications bus 37 and associated microcontrollers and sensors.

The remote device including a server and access to at least one data analysis application computer program.

The DTE telemetry microprocessor 31 storing the unfiltered data and the filtered data in a data log as a data structure including unfiltered data interspersed with the filtered data characterized by the significant event.

The DCE wireless telemetry communications microprocessor 32 transmits the data structure to the remote device upon command. The remote device stores the data structure for further analysis by the data analysis application computer program.

The present invention has both business and technical use. For example, one such use is in the insurance industry. In an actuarial sense, insurance premiums could be based in part by assessing the number and type of significant events over a period of time. Alternatively, in a forensic sense, the data structure acquired by the present invention could be assessed to provide a better understanding into the significant event.

As another example, the data structure acquired by the present invention could also be transferred to special logs that when assessed illustrate or chart accident frequency relating to specific geographic areas.

Embodiments of the present invention provide one or more technical effects. More specifically, the ability for real time on-going detailed acquisition and retention of data in a memory partition. The ability to detect a significant event or accident based upon a threshold value when comparing an unfiltered data point with a filtered data point. The ability to switch to a detailed high frequency raw unfiltered data acquisition mode based upon detecting a significant event. The ability for a filter to have a high rate of averaging, lowering the memory requirements for filtered data, following an acceleration curve, and detecting events with the aid of an unfiltered data point. The ability to store locally within the system or transmit to a remote device the high frequency raw unfiltered data. The ability to preserve the high frequency raw unfiltered data for post accident forensics and analysis. A further ability is to preserve both low frequency filtered data with high frequency unfiltered in a continuous timeline within memory.

While the present invention has been described with respect to the non-limiting embodiments, it is to be understood that the invention is not limited to the disclosed embodiments. Persons skilled in the art understand that the disclosed invention is intended to cover various modifications and equivalent arrangements included within the scope of the appended claims. Thus, the present invention should not be limited by any of the described embodiments.

What is claimed is:

1. A computer readable storage medium having computer readable program code for executing a method for detecting a significant event and switching the data acquisition mode, said method comprising the steps of:
   checking a state of a data acquisition mode,
      if said state is in a filtered data state and if a real time steep accelerometer indicator value is at or above an accelerometer threshold value,
         switch said data acquisition mode to an unfiltered data state and acquire a series of high frequency unfiltered data points,
      if said data acquisition mode is in an unfiltered data state and if said real time steep accelerometer indicator value is below said accelerometer threshold value,
         switch said data acquisition mode to a filtered data state and acquire a series of low frequency filtered data points.

2. A method as in claim 1 wherein said unfiltered data state is an adaptive data state, a further including an adaptive filter, said adaptive filter being less than a filter in said filtered data state and more than a filter in said unfiltered data state wherein said series of low frequency unfiltered data points is adaptive data.

3. A method as in claims 1 or 2 wherein said real time steep accelerometer indicator value is determined by a filter and accelerometer data.

4. A method as in claim 3 wherein said filter is a low pass filter.

5. A method as in claim 3 wherein said filter is a moving average filter.

6. A method as in claim 5 wherein said moving average filter provides an accelerometer based low frequency filtered data point and said real time steep accelerometer indicator value is determined by comparing said accelerometer based filtered data point with an accelerometer based high frequency unfiltered data point.

7. A method as in claim 6 wherein said comparing is selected from the group consisting of:
subtracting an accelerometer based low frequency filtered data point and an accelerometer based high frequency unfiltered data point, and
an absolute value between an accelerometer based low frequency filtered data point and an accelerometer high frequency unfiltered data point.

8. A method as in claim 1 or 2 wherein said accelerometer threshold value is selected from the group consisting of:
a set predetermined value,
a programmable value,
a real time programmable value,
a vector based value, and
a magnitude based value.

9. A method as in claim 1 or 2 wherein said accelerometer threshold value includes multiple threshold values.

10. A method as in claim 9 wherein said multiple threshold values are graduated values selected from the group consisting of
a high value,
a medium value, and
a low value.

11. A method as in claim 1 or 2 wherein each axis of an accelerometer has an associated accelerometer threshold value.

12. A method as in claim 1 or 2 wherein said series of high frequency unfiltered data points and said low frequency filtered data points are stored as a data log.

13. A method as in claim 12 wherein said data log is stored in memory.

14. A method as in claim 12 wherein said data log is transmitted to a remote device.

15. A method as in claim 12 wherein said data log is a data structure.

16. A method as in claim 15 wherein said high frequency unfiltered data points includes data selected from the group consisting of:
accelerometer data,
vehicular data and information, and
GPS data.

17. A method as in claim 15 wherein said low frequency filtered data points includes data selected from the group consisting of:
accelerometer data,
vehicular data and information, and
GPS data.

18. A method as in claim 12 wherein said data log includes said high frequency unfiltered data points interspersed with said low frequency filtered data points characterized by said significant event.

19. A method as in claim 15 wherein said data structure is stored in a computer readable medium.

20. An apparatus for detecting a significant event and switching a data acquisition mode, the apparatus comprising:
a microprocessor, an accelerometer, and a memory,
said microprocessor communicating with said accelerometer and said memory,
said accelerometer communicating data corresponding to an axis of said accelerometer to said microprocessor,
said microprocessor executing computer program code for:
checking a state of said data acquisition mode,
if said state is in a filtered data state and if a real time steep accelerometer indicator value is at or above an accelerometer threshold value,
switch said data acquisition mode to an unfiltered data state and acquire a series of high frequency unfiltered data points,
if said data acquisition mode is in an unfiltered data state and if said real time steep accelerometer indicator value is below said accelerometer threshold value,
switch said data acquisition mode to a filtered data state and acquire a series of low frequency filtered data points.

21. An apparatus as in claim 20 wherein said unfiltered data state is an adaptive data state, further including an adaptive filter being less than a filter in said filtered data state and more than a filter in said unfiltered data state wherein said acquire high frequency unfiltered data points is adaptive data.

22. An apparatus as in claim 20 or 21 wherein said microprocessor executing computer program code further determining said real time steep accelerometer indicator value by a filter and accelerometer data.

23. An apparatus as in claim 22 wherein said filter is a low pass filter.

24. An apparatus as in claim 22 wherein said filter is a moving average filter.

25. An apparatus as in claim 24 wherein said microprocessor executing computer program code of said moving average filter providing an accelerometer based low frequency filtered data point and said real time steep accelerometer indicator value is determined by comparing said accelerometer based low frequency filtered data point with an accelerometer based high frequency unfiltered data point.

26. An apparatus as in claim 25 wherein said comparing is selected from the group consisting of:
subtracting an accelerometer based low frequency filtered data point and an accelerometer based high frequency unfiltered data point, and
an absolute value between an accelerometer based low frequency filtered data point and an accelerometer high frequency unfiltered data point.

27. An apparatus as in claims 20 or 21 wherein said accelerometer threshold value is selected from the group consisting of:
a set predetermined value,
a programmable value,
a real time programmable value,
a vector based value, and
a magnitude based value.

28. An apparatus as in claim 26 wherein said accelerometer threshold value includes multiple threshold values selected from the group consisting of:
a high value,
a medium value, and
a low value.

29. An apparatus as in claims 20 or 21 wherein each axis of said accelerometer includes an associated accelerometer threshold value.

30. An apparatus as in claims 20 or 21 wherein said microprocessor stores said high frequency unfiltered data points and said low frequency filtered data points as a data log.

31. An apparatus as in claim 30 wherein said data log is stored in memory by said microprocessor.

32. An apparatus as in claim 30 further including a communications microprocessor wherein said data log is transmitted to a remote device.

33. An apparatus as in claim 30 wherein said data log is a data structure.

34. An apparatus as in claim 33 wherein said high frequency unfiltered data points includes data selected from the group consisting of:
   accelerometer data,
   vehicular data and information, and
   GPS data.

35. An apparatus as in claim 33 wherein said low frequency filtered data points includes data selected from the group consisting of:
   accelerometer data,
   vehicular data and information, and
   GPS data.

36. An apparatus as in claim 31 wherein said data log includes said high frequency unfiltered data points interspersed with said low frequency filtered data points characterized by said significant event.

37. An apparatus as in claims 20 or 21 wherein said accelerometer has multiple axes and an associated accelerometer threshold value for each axis and a real time steep accelerometer indicator value for each axis.

38. A system for detecting a significant event, the system comprising:
   a vehicular telematics system, and
   a remote device,
   said telematics system including:
   an on-board portion and a resident portion, said on-board portion including a microprocessor and firmware for executing computer program code for detecting an event and formatting a data structure, an accelerometer for providing accelerometer data to said microprocessor, a communications microprocessor for transmitting said data structure, a GPS module for providing GPS data to said microprocessor, memory for storing said data structure, and an interface to the resident portion for receiving vehicular data and information from a vehicle network communications bus and associated microcontrollers and sensors,
   said remote device including a server and access to at least one data analysis application computer program,
   said microprocessor and firmware checking a state of a data acquisition mode, if said state is in a filtered data state and if a real time steep accelerometer indicator value is at or above an accelerometer threshold value, switch said data acquisition mode to an unfiltered data state and acquire a series of high frequency unfiltered data points, if said data acquisition mode is in an unfiltered data state and if said real time steep accelerometer indicator value is below said accelerometer threshold value, switch said data acquisition mode to a filtered data state and acquire a series of low frequency filtered data points,
   said microprocessor storing said series of high frequency unfiltered data points and said series of low frequency filtered data points in a data log as a data structure including high frequency unfiltered data interspersed with said low frequency filtered data characterized by said significant event,
   wherein said telematics system transmits said data structure to said remote device and said remote device stores said data structure for further analysis by said data analysis application computer program.

* * * * *